(12) United States Patent
Harada et al.

(10) Patent No.: US 6,665,590 B2
(45) Date of Patent: Dec. 16, 2003

(54) OPERATION SUPPORT SYSTEM

(75) Inventors: Yasushi Harada, Hitachi (JP); Yasushi Tomita, Mito (JP); Shigeru Sugiyama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/077,807

(22) Filed: Feb. 20, 2002

(65) Prior Publication Data

US 2003/0083787 A1 May 1, 2003

(30) Foreign Application Priority Data

Oct. 30, 2001 (JP) ........................................ 2001-331928

(51) Int. Cl.[7] .............................................. G05D 27/02
(52) U.S. Cl. .......................... 700/291; 700/295; 307/20
(58) Field of Search ................................ 700/291, 286, 700/292, 295, 83; 307/38, 39, 20, 24; 340/659

(56) References Cited

U.S. PATENT DOCUMENTS

| | | | | |
|---|---|---|---|---|
| 4,023,043 A | * | 5/1977 | Stevenson | 307/38 |
| 4,168,491 A | * | 9/1979 | Phillips et al. | 307/39 |
| 5,414,640 A | * | 5/1995 | Seem | 700/291 |
| 5,479,358 A | * | 12/1995 | Shimoda et al. | 700/291 |
| 6,290,140 B1 | * | 9/2001 | Pesko et al. | 236/47 |

FOREIGN PATENT DOCUMENTS

JP   11-346438   12/1999

OTHER PUBLICATIONS

"'99 Collection Of Energy Saving Cases" Energy Saving Center, vol. 1, p. 6.
"'99 Collection Of Energy Saving Cases" Energy Saving Center, vol. 2, pp. 786–787.
"Energy Saving Diagnosis And Concrete Measures" N.T.S., p. 53.
K. Ito, et al, *Optimal Planning Of Cogeneration*, Sangyo-Tosho, 1990, pp. 57–63.
S. Ishimura, *"Easily Understandable Statistics Analysis"* Tokyo–Tosho, 1993, pp. 14–27.

* cited by examiner

*Primary Examiner*—Albert W. Paladini
(74) *Attorney, Agent, or Firm*—McDermott, Will & Emery (57) ABSTRACT

An operation support system is arranged to effectively provide an operator of an energy supply facility for supplying a plurality of energies in different forms with a hint of an operating method in which energy safety supply and operation cost reduction are both realized. The operation support system takes the steps of deriving demand prediction upper limit value and lower value for each energy form based on recorded demand data; deriving target operation pattern upper and lower limit values of each energy supply device based on the demand prediction upper and lower values; and displaying the target operation pattern upper and lower limit values.

8 Claims, 9 Drawing Sheets

| No. | ELECTRIC POWER (kJ/s) | STEAM (kJ/s) | CHILLED WATER (kJ/s) | OCCURRENCE PROBABILITY |
|---|---|---|---|---|
| 1 | 353 | 249 | 150 | 0.216 |
| 2 | 353 | 249 | 151.2 | 0.072 |
| 3 | 353 | 249 | 148.8 | 0.072 |
| 4 | 353 | 265.4 | 150 | 0.072 |
| 5 | 353 | 232.6 | 150 | 0.072 |
| 6 | 355.0 | 249 | 150 | 0.072 |
| 7 | 351.0 | 249 | 150 | 0.072 |
| 8 | 353 | 265.4 | 151.2 | 0.024 |
| 9 | 353 | 265.4 | 148.8 | 0.024 |
| 10 | 353 | 232.6 | 151.2 | 0.024 |
| 11 | 353 | 232.6 | 148.8 | 0.024 |
| 12 | 355.0 | 249 | 151.2 | 0.024 |
| 13 | 355.0 | 249 | 148.8 | 0.024 |
| 14 | 351.0 | 249 | 151.2 | 0.024 |
| 15 | 351.0 | 249 | 148.8 | 0.024 |
| 16 | 355.0 | 265.4 | 150 | 0.024 |
| 17 | 355.0 | 232.6 | 150 | 0.024 |
| 18 | 351.0 | 265.4 | 150 | 0.024 |
| 19 | 351.0 | 232.6 | 150 | 0.024 |
| 20 | 355.0 | 265.4 | 151.2 | 0.008 |
| 21 | 355.0 | 265.4 | 148.8 | 0.008 |
| 22 | 355.0 | 232.6 | 151.2 | 0.008 |
| 23 | 355.0 | 232.6 | 148.8 | 0.008 |
| 24 | 351.0 | 265.4 | 151.2 | 0.008 |
| 25 | 351.0 | 265.4 | 148.8 | 0.008 |
| 26 | 351.0 | 232.6 | 151.2 | 0.008 |
| 27 | 351.0 | 232.6 | 148.8 | 0.008 |

51 SAMPLE DATA

GENERATION OF SAMPLE DATA

|  | ELECTRIC POWER (kJ/s) | OCCURRENCE PROBABILITY | STEAM (kJ/s) | OCCURRENCE PROBABILITY | CHILLED WATER (kJ/s) | OCCURRENCE PROBABILITY |
|---|---|---|---|---|---|---|
| DEMAND PREDICTION CENTER | 353 | 0.6 | 249 | 0.6 | 150 | 0.6 |
| DEMAND PREDICTION UPPER LIMIT | 355.0 | 0.2 | 265.4 | 0.2 | 151.2 | 0.2 |
| DEMAND PREDICTION LOWER LIMIT | 351.0 | 0.2 | 232.6 | 0.2 | 148.8 | 0.2 |

| No. | GAS TURBINE (kJ/s) | STEAM TURBINE (kJ/s) | ABSORPTION REFRIGERATOR (kJ/s) | GAS BOILER (kJ/s) | OCCURRENCE PROBABILITY |
|---|---|---|---|---|---|
| 1 | 300 | 50 | 150 | 549 | 0.216 |
| 2 | 300 | 50 | 151 | 554 | 0.072 |
| 3 | 300 | 50 | 149 | 544 | 0.072 |
| 4 | 300 | 40 | 150 | 535 | 0.072 |
| 5 | 300 | 50 | 150 | 533 | 0.072 |
| 6 | 300 | 50 | 150 | 549 | 0.072 |
| 7 | 300 | 50 | 150 | 549 | 0.072 |
| 8 | 300 | 40 | 151 | 540 | 0.024 |
| 9 | 300 | 40 | 149 | 530 | 0.024 |
| 10 | 300 | 50 | 151 | 538 | 0.024 |
| 11 | 300 | 50 | 149 | 528 | 0.024 |
| 12 | 300 | 50 | 151 | 554 | 0.024 |
| 13 | 300 | 50 | 149 | 544 | 0.024 |
| 14 | 300 | 50 | 151 | 554 | 0.024 |
| 15 | 300 | 50 | 149 | 544 | 0.024 |
| 16 | 300 | 40 | 150 | 535 | 0.024 |
| 17 | 300 | 50 | 150 | 533 | 0.024 |
| 18 | 300 | 40 | 150 | 535 | 0.024 |
| 19 | 300 | 50 | 150 | 533 | 0.024 |
| 20 | 300 | 40 | 151 | 540 | 0.008 |
| 21 | 300 | 40 | 149 | 530 | 0.008 |
| 22 | 300 | 50 | 151 | 538 | 0.008 |
| 23 | 300 | 50 | 149 | 528 | 0.008 |
| 24 | 300 | 40 | 151 | 540 | 0.008 |
| 25 | 300 | 40 | 149 | 530 | 0.008 |
| 26 | 300 | 50 | 151 | 538 | 0.008 |
| 27 | 300 | 50 | 149 | 528 | 0.008 |

61 OPTIMAL OPERATION PATTERN

FIG.7

71 TARGET OPERATION UPPER AND LOWER LIMITS

|  | GAS TURBINE (kJ/s) | STEAM TURBINE (kJ/s) | ABSORPTION REFRIGERATOR (kJ/s) | GAS BOILER (kJ/s) |
|---|---|---|---|---|
| TARGET OPERATION PATTERN UPPER LIMIT | 300 | 50 | 151 | 554 |
| TARGET OPERATION PATTERN LOWER LIMIT | 300 | 40 | 149 | 528 |

FIG.12

OPERATION SUPPORT SYSTEM

BACKGROUND OF THE INVENTION

The present invention relates to an operation support system for a facility of supplying a plurality of energy forms such as electric power and heat, and more particularly to the system which properly supports the operation of the energy supply facility if change of demands cannot be precisely predicted.

As a typical example of an electric power or heat energy supply facility, there have been proposed a gas turbine (that supplies electric power and exhaust heat vapor by gas), a steam turbine (that supplies electric power by steam), a steam absorption refrigerator (that supplies chilled water by steam), an electric turbo refrigerator (that supplies chilled water by electric power), and so forth. The energy supply facility composed of those devices are difficult to be properly operated on account of the following two reasons. First, the energy supply facility is arranged to keep those devices closely related with one another in such a manner that the gas turbine and the steam turbine are complemented with each other in respect of the electric power supply and the steam absorption refrigerator collects exhaust heat from the steam turbine. Second, the energy demand may fluctuate depending on variables such as a weather and a temperature or any obscure cause.

In order to overcome these difficulties, the two background arts have been proposed. The first background art is a method of patterning an operation method (such as a start and stop time and a number of operating devices) and operating the facility according to the pattern. The concrete example of the target operation pattern is described in the page 6 of "'99 Collection of Energy Saving Cases (first volume)" edited by the Energy Saving Center (Incorporated Foundation), pages 786 to 787 of "'99 Collection of Energy Saving Cases (second volume)" edited by the Energy Saving Center (Incorporated Foundation), and page 53 of "Energy Saving Diagnosis and Concrete Measures" edited by NTS (Limited). By predetermining such an allowable target operation pattern as coping with some demand fluctuations, the operation enables to operate the energy supply facility with safety according to the predetermined operation pattern, which makes the safety supply of energy possible.

The second background art is described in JP-A-11-346438. The method of the background art is arranged so that for supplying an operator with a future predicted value of an electric power demand, the electric power demand is predicted at each interval as estimating a prediction error and are displayed. The application of this method makes it possible for an operation to know a prediction-deviating range or possibility and thereby to operate the energy supply facility according to the range or possibility. For example, if a future power demand may greatly exceed the prediction value, the application of this background art makes it possible for the operator to easily determine that one more generator than usual needs to be started. Or, if the future power demand may substantially match to the prediction value, the application of this background art makes it possible for the operator to easily determine that a reserve of energy may be partially reduced.

The first background art has concerned with the method of realizing the safety operation of the energy supply facility. This art may, however, burdens itself with the additional operation cost. For example, when both the electric power and the steam are supplied by the gas turbine, assuming that the predetermined target operation pattern of the gas turbine is at the "constant full operation" and the gas turbine supplies more steam than needed according to the target operation pattern, the surplus stream is abandoned. It is certain that the energy may be supplied with safety according to this target operation pattern, but the surplus stream is abandoned. The operation cost thus may be increased more than needed.

The second background art provides a hint of keeping the electric power safety supply and the operation cost reduction in prompting an electric power system in compatibility by presenting the prediction value of the power demand with an error range to an operator. However, unlike the promotion of the electric power system, as to the electric power or heat energy supply facility built in a factory or a building, since a plurality of energy supply facilities are closely related with one another, even if the demand prediction values of electric power, steam, heated air and cool air may be presented to the operator together with their error ranges, the operator cannot easily determine how to cope with each prediction error with its error range. As one example, consider the energy supply facility composed of a combined cycle generator device and a heat recovery device, the combined cycle generator device serving to drive a steam turbine by using part of exhaust stream from the gas turbine and the heat recovery device serving to utilize the remaining exhaust stream for a water heater. Even if the gradual increase of the demand prediction values of both the electric power and the water heater load is quantitatively presented to the operator, the operator cannot easily determine how to cope with the demand prediction value.

The reason of the difficulty in determining how to cope with the prediction value is placed on a sophistication of an energy supply facility configuration and function in using many kinds of energies such as electric power, stream and chilled water. For example, as one of the methods of coping with the increase of the power demand, there may be proposed a method of raising a steam turbine output. This method may bring about an adverse effect by a shortage of a steam supply for a water heater because of increasing the steam consumption of the steam turbine. Even if the steam supply is not in short, at a certain unit price of the electricity tariff, the cost may be lowered not by raising the output of the steam turbine but by increasing the electricity bought from the commercial electric power. As indicated by this example, the operator cannot easily determine whether or not the manipulation of raising the steam turbine output is in proper from both viewpoints of safety supply and reduction of an operation cost.

SUMMARY OF THE INVENTION

It is an object of the present invention to provide an operation support system which provides an operator with a hint of keeping two objects of energy safety supply and operation cost reduction in compatibility by presenting a target operation pattern of an energy supply facility for each energy form to the operator according to the demand continuously fluctuating on some variable factors in a plurality of energy supply devices for supplying different energy forms such as a cogeneration energy supply device and in an energy supply system provided with a plurality of energy demands.

It is another object of the present invention to provide an operation support system which provides an operator with a hint on the operating method of keeping the energy safety supply and the operation cost reduction in compatibility in an energy supply facility for supplying energy in response to electric power and head demands fluctuating on variable factors.

According to a first aspect of the solving means provided by the invention, an energy supply facility for supplying different energy forms is arranged to predict an upper and a lower limits of a demand of each energy form and present an operator with a target operation pattern of each device for each energy form with the upper and the lower limits, the target operation pattern being based on the upper and the lower limit values of the demand. For deriving the upper and the lower limits of the target operation pattern, such upper and lower limits of the target operation pattern as reducing the operation cost as much as possible are derived in consideration of the error range of the energy demand prediction caused by variable factors. The present invention may present the operator with the upper and the lower limits of the target operation pattern. Hence, the operator can concretely obtain the operating policy of supplying energy with safety and reducing an operation cost.

In particular, the present invention presents an operation with not the target operation pattern but the upper and the lower limit of the target operation pattern of each energy form. The operator thus clearly gets to know the reliability of the target operation pattern. For example, if the width between the upper and the lower limits of a certain target operation pattern is narrow, the target operation pattern is difficult to suffer from the adverse effect of the demand prediction error. It means that the target operation pattern has a high reliability. Conversely, if the width between the upper and the lower limits of a certain target operation pattern is wide, the target operation pattern is easy to suffer from the adverse effect of the demand prediction error. It means that the target operation pattern has a low reliability.

As mentioned above, the application of the present invention makes it possible for the operator to get to know all the operation policies including all the factors up to the reliability of the target operation pattern. The reliability of the target operation pattern, termed herein, indicates how much the operator may follow the target operation pattern with fidelity. It means that if the reliability is lower, the operator is not required to follow the target operation pattern so much, while if it is high, the operator should follow the target pattern with fidelity.

According to the second aspect of the solving means provided by the present invention, the operation support system is arranged to present an operator with a target operation pattern probability density distribution. Like the first aspect, the operator can concretely obtain a hint on the operating method in keeping the energy safety supply and the operation cost reduction in compatibility. For example, if the peak of the density distribution is low and the skirts thereof are wide, it means that the width between the upper and the lower limits of the target operation pattern is wide in the first method. Conversely, if the peak of the target operation pattern probability density distribution is high and the skirts thereof are narrow, it means that the width between the upper and the lower limits of the target operation pattern is narrow in the first method.

According to the present invention, by presenting the upper and the lower limits of the target operation pattern derived in consideration of the demands fluctuating on variable factors to the operator of the energy facility, the operator is given an effective support in keeping the energy safety supply and the operation cost reduction in compatibility.

Other objects, features and advantages of the invention will become apparent from the following description of the embodiments of the invention taken in conjunction with the accompanying drawings.

DESCRIPTION OF THE EMBODIMENTS

Hereafter, the description will be oriented to the configuration of the operation support system according to the invention. As an example of applying an operation support system according to the invention, a summary of the configuration of the cogeneration energy supply facility will be described with reference to FIG. 12. The cogeneration supply facility is served to supply each of different energy forms such as electric power, stream and chilled water in association with the commercial electric power. The supply facility is composed of a gas turbine GT operated by town gas as energy supplying means, a gas boiler GB operated by town gas, a steam turbine ST operated by steam, and an absorption refrigerator AC operated to supply chilled water by steam.

Figure 12:
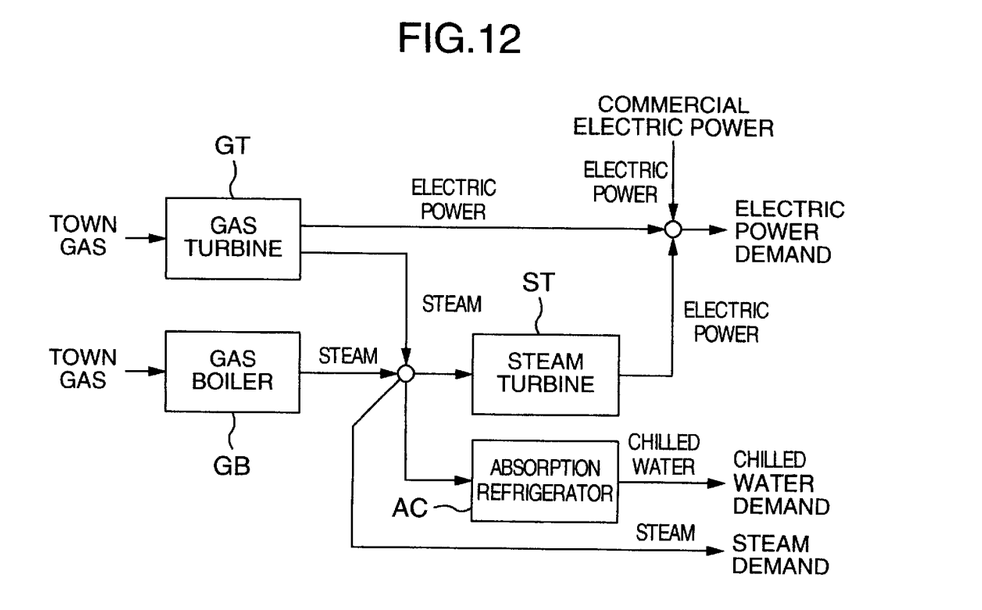
FIG. 12 is a diagram for describing a configuration of a cogeneration energy supply facility to which the operation support system of the present invention applies.

The gas turbine GT is served to generate electric power by driving a generator as well as to generate steam by using waste heat. The gas boiler GB is served to generate steam. The steam turbine ST is served to generate electric power by using steam. The absorption refrigerator AC is served to supply chilled water by using steam. The electric power from the gas turbine GT and the gas boiler GB is supplied to the electric demand in association with the commercial electric power. The steam from the gas turbine GT and the gas boiler GB is partially supplied to the steam turbine ST in which it is converted into the electric power and partially supplied to the absorption refrigerator AC from which the chilled water is supplied. The remains of the steam are supplied to the steam demand. The chilled water generated by the absorption refrigerator AC is supplied to the chilled water demand.

Figure 1:
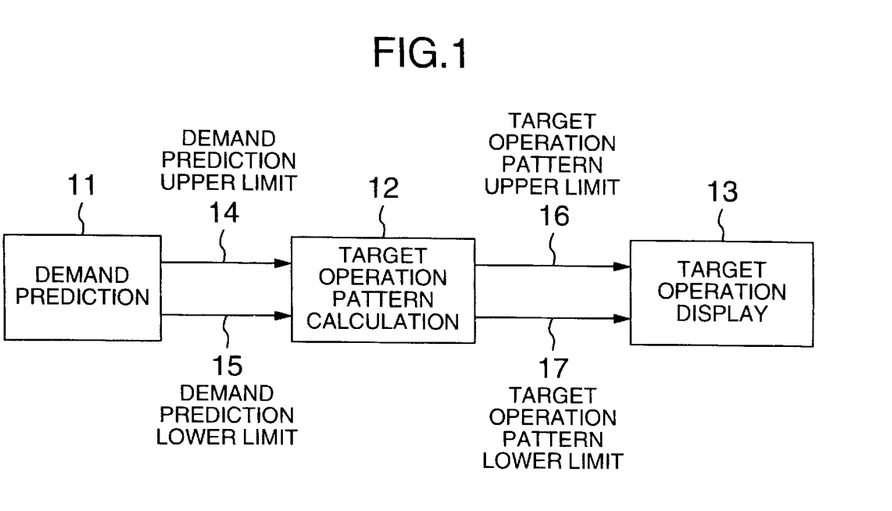
FIG. 1 is a function block diagram showing an operation support system according to a first embodiment of the present invention.

Hereafter, the description will be oriented to the operation support system according to the present invention. FIG. 1 is a function block diagram for realizing the operation support system according to the first embodiment of the invention. The operation support system is arranged to have a demand predicting unit 11, a target operation pattern calculating unit 12, and a target operation pattern displaying unit 13. The demand predicting unit 11 is served to derive demand prediction upper limit value 14 and lower limit value 15. The target operation pattern calculating unit 12 is served to derive target operation pattern upper and lower limit values 16 and 17. The target operation pattern displaying unit 13 is served to display the target operation pattern upper and lower limit values 16 and 17. This makes it possible for the operator to obtain any policy of how each of the energy supply devices composing the energy supply facility should be operated on the basis of the upper and the lower limits of the displayed target operation pattern.

For example, if the width between the upper and the lower limit of the target operation pattern in a certain energy supply device is narrow, the operator tries to fit the actual operation pattern in the narrow range, while if the width is wide, the operator can easily fit the actual operation pattern in the wide range.

Figure 2:
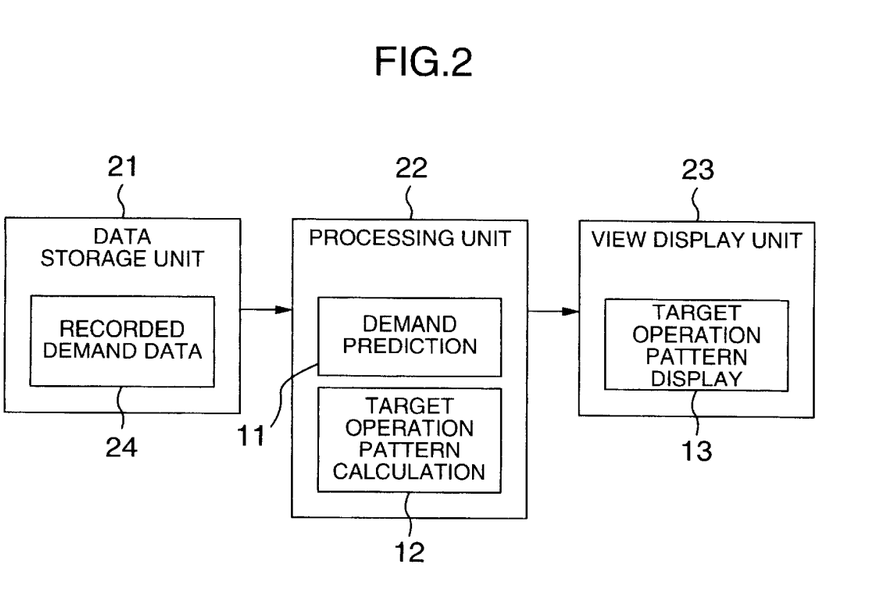
FIG. 2 is a system block diagram showing an operation support system according to the first embodiment of the present invention.

FIG. 2 shows a system block diagram of the hardware for realizing the operation support system according to the invention. The operation support system is composed of a data storage unit 21, a processing unit 22, and a screen display unit 23.

The data storage unit 21 is served to store the actual demand data 24 that corresponds to the past demand records for each energy form. The actual demand data 24 is applied to the demand predicting unit 11.

The processing unit 22 is provided with the demand predicting unit 11 and the target operation pattern calculating unit 12 and performs the operations required for both of the units 11 and 12. The demand predicting unit 11 is served to calculate the demand prediction upper and lower limit values of each energy form through the use of the actual demand prediction data 24. The target operation pattern calculating unit 12 is served to calculate the target operation pattern and its upper and lower limit values of each energy supply device based on the demand prediction upper and lower limit values of each energy form.

The view display unit 23 is provided with the target operation pattern display unit 13 and is served to display the target operation pattern calculated by the target operation pattern calculating unit 12.

Figure 3:
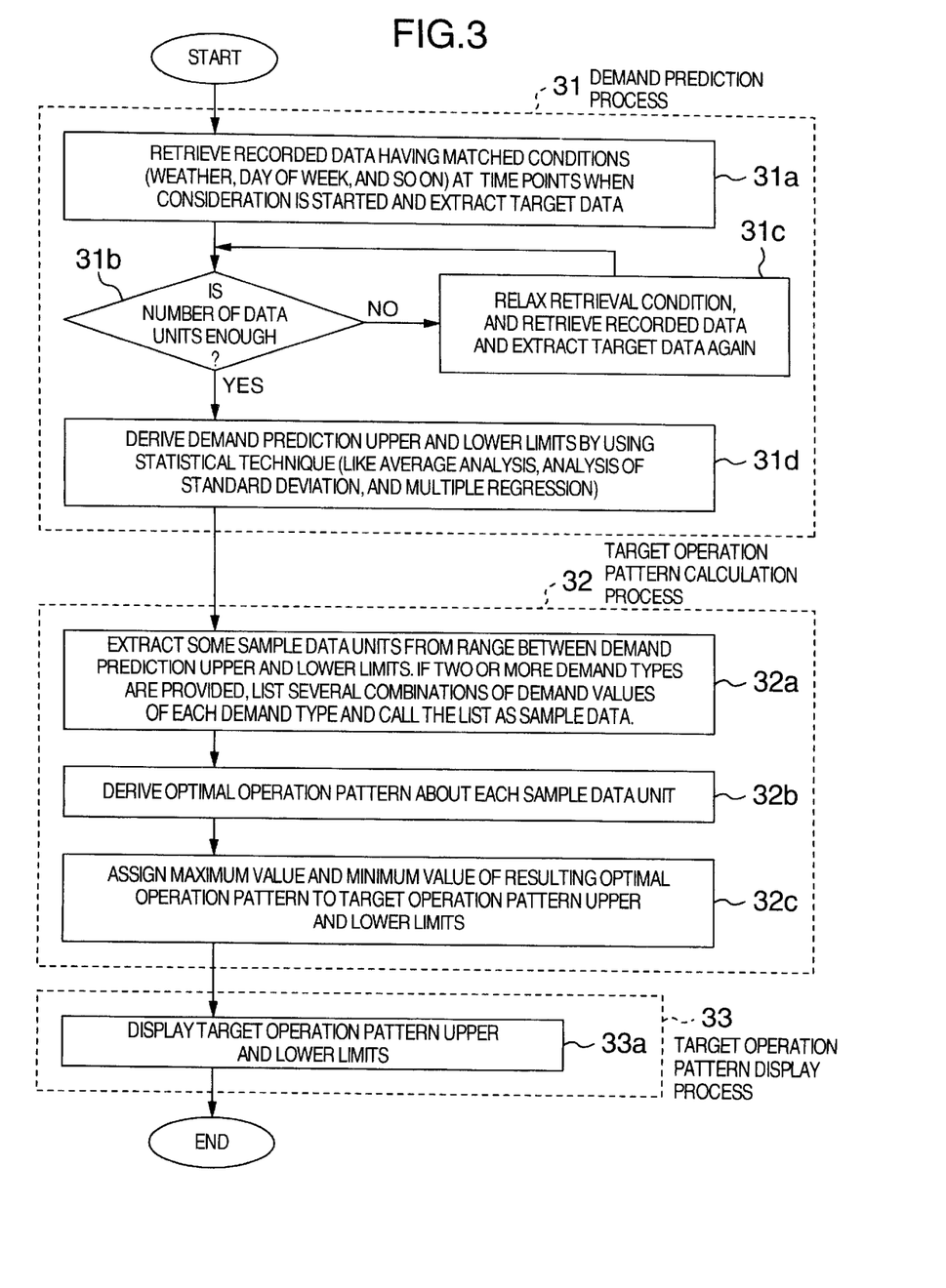
FIG. 3 is a flowchart showing a process of the operation support system according to the present invention.

The process of realizing the operation support system according to the invention will be described with reference to the flowchart of FIG. 3. The operation support system executes the processes of the demand prediction 31, the target operation pattern calculation 32, and the target operation pattern display 33 in the describing sequence.

The demand prediction process 31 to be executed by the demand predicting unit 11 is executed to retrieve the recorded demand data 24 for extracting the past recorded data that have the same conditions (a weather, a day of the week and so forth) at the target time point when the consideration is started, for preparing the basic data required for predicting the demand (31a).

If the number of extracted data units is not enough, the accuracy of the demand precision is made lower. Hence, it is checked if the number of the extracted data units is enough (31b). As the determining criterion of it, some threshold values may be provided.

If the number of the extracted data units is not enough, the retrieval condition is relaxed. Then, the actual demand data 24 is again retrieved for extracting the past recorded data (31c). As the method of relaxing the retrieval condition, for example, when the predicted temperature is 25° C., the data including 25° C. as well as 24° C. and 26° C. are extracted from the recorded temperatures. Or, when the demand on Wednesday is predicted, the data including the recorded data on Wednesday as well as the other days of the week are extracted from the recorded data.

If a sufficient number of the recorded data units are extracted, the demand prediction upper and lower limits of each energy form are derived through the use of the statistical technology based on the extracted data units (31d). As a method of deriving the demand prediction upper and lower limits, it is possible to utilize the method of assigning an average value±standard deviation to the upper and the lower limits of the demand prediction. The foregoing process corresponds to the content of the demand prediction process 31.

Then, the target operation pattern calculation process 31 to be executed by the target operation pattern calculating unit 12 prepares some sample data units about the demand value for each energy form as the basic data for deriving the optimal operation pattern (32a). In the present invention, the demand prediction value has some width (that is, the upper and the lower limits of the demand prediction are set). In general, however, the optimal operation pattern is different depending on a certain demand prediction value between the upper and the lower limits. For deriving the optimal operation pattern, it is necessary to extract some sample data units between the upper and the lower limits of the demand prediction. In addition, for a plurality of energy forms whose demands are to be predicted, such as electric power, steam and chilled water, the combination of the demand values for each energy form is treated as sample data.

In turn, the optimal operation pattern for each energy supply device is derived by using each sample data unit (32b). The optimal operation pattern, termed herein, means the operation to be executed at a minimum cost. However, the concept of the present invention may be also applied to the operation at a minimum $CO_2$ exhaust or the operation at a minimum energy consumption converted into oil. The method of deriving the optimal operation pattern may be obtained by applying the technology described in ITO Kouichi and YOKOYAMA Ryouhei "Optimal Planning of Cogeneration", pages 57 to 63, Sangyou-Tosho (1990). The application of this method makes it possible to obtain the operation pattern at a minimum cost in the constraint condition that energy can be positively supplied in response to the demand. The method of deriving the optimal operation pattern is not limited to the foregoing method. In place, the experimental operating method or the operating rules based on the experimental knowledge of an operator may be applied to the method.

The maximum value and the minimum value of the optimal operation pattern for each energy supply device is assigned to the upper limit value and the lower limit value of the target operation pattern, respectively (32c). The foregoing process is the content of the target operation pattern calculating process 32.

Lastly, the target operation pattern displaying process to be executed by the target operation pattern displaying unit 13 is served to display the upper and the lower limits of the target operation pattern on the target operation pattern displaying unit 13 (33a).

The foregoing series of processes make it possible for the operator to view the target operation pattern with the upper and the lower limits of each energy supply device, thereby allowing the operator to obtain a hint of how to operate the energy supply device as keeping the energy safety supply and the operation cost reduction in compatibility.

Figure 4:
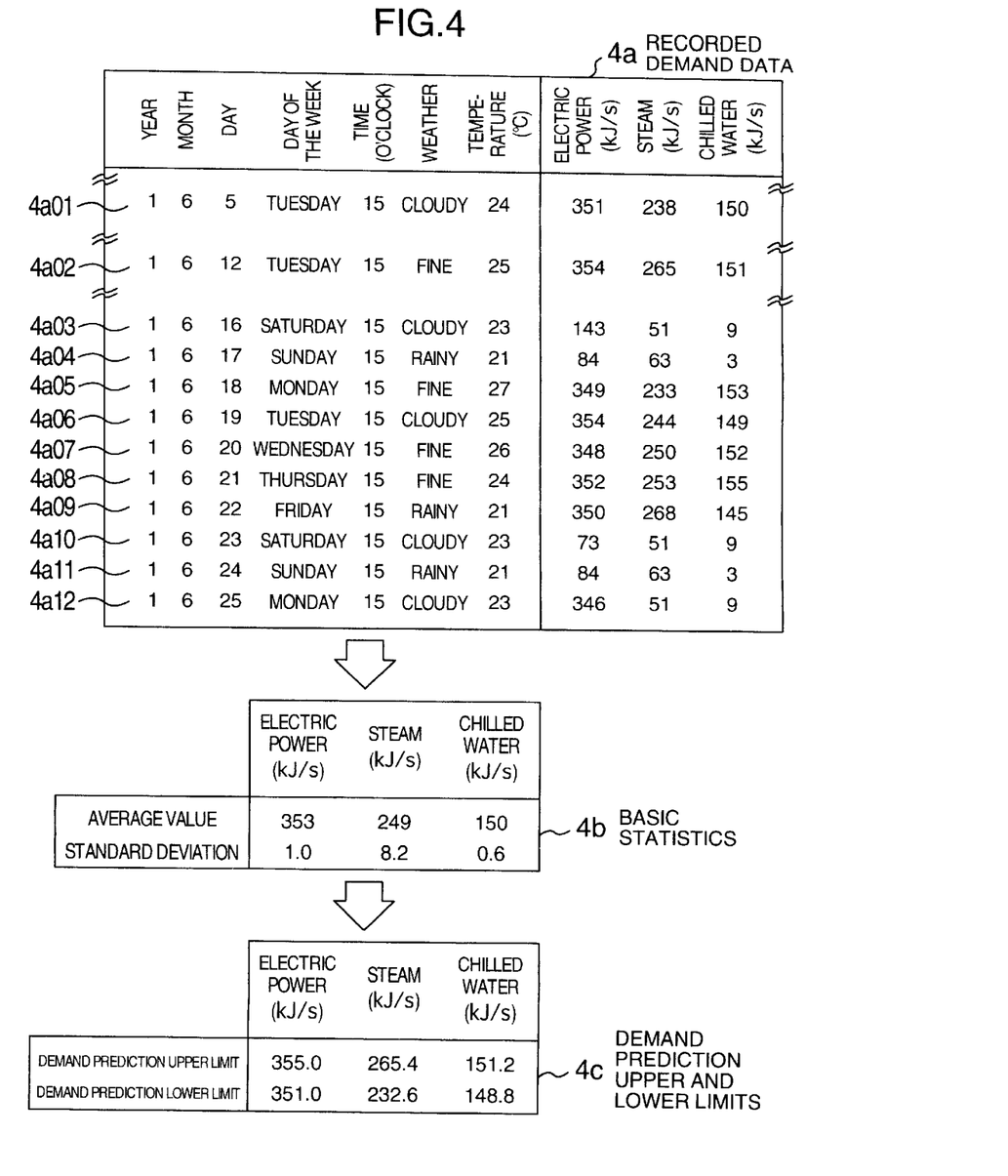
FIG. 4 is a table showing data on demand records for describing a procedure of a demand predicting unit.

The composition of the recorded demand data 24 and the exemplary method of obtaining the upper and the lower values of the demand prediction will be described with reference to FIG. 4. In FIG. 4, a numeral 4a denotes an example of the recorded demand data 24 to be used when the demand predicting unit 11 derives the demand prediction upper limit value 14 and lower limit value 15. In the example of FIG. 4, the recorded demand data includes "year", "month", "day", "day of the week", "time", "weather", "temperature", "electric power demand", "stream demand", and "chilled water demand" as data items. Hereafter, the description will be oriented to the method of deriving the upper and the lower limit values of the demand prediction with reference to the data.

First, a process is executed to extract the recorded data matching to the demand-prediction condition from all the data items. For example, when the demands for an electric power, steam and chilled water amounts are to be predicted at 1500 hours, Tuesday, Jun. 26, 2001, in a cloudy weather, and at a temperature of 25° C., the data is extracted from all the data items with the items of June, Tuesday, three o'clock in the afternoon, and cloudy as a key. In the example 4a, the row 4a06, that is, the data on June 19 corresponds to the concerned data. If the number of the extracted data items is not enough, the weather item may be ignored, the temperature of 25° C. may be included as a key item, or the temperature of 24° C. to 26° C. may be included as a key item. For example, in the example 4a, assuming that the weather is ignored and the temperature range is 24° C. to 26° C., the rows 4a01 and 4a02, that is, the data on June 5 and June 12 are extracted.

Second, based on the extracted recorded demand data of each energy form, the basic statistics (specifically, average values and standard deviations) 4b of electric power, steam and chilled water are derived. The basic statistics 4b in FIG. 4 is derived on the extracted data 4a01, 4a02 and 4a06. The method of calculating an average value and a standard deviation may utilize the method described in ISHIMURA Sadao, "Easily Understandable Statistics Analysis", pages 14 to 27, Tokyo-Tosho (1993). The basic statistics 4b is obtained by the following expressions.

$$\text{Average Value of Electric Power} = \frac{351 + 354 + 354}{3} = 353$$

$$\text{Average Value of Steam} = \frac{238 + 265 + 244}{3} = 249$$

$$\text{Average Value of Chilled Water} = \frac{150 + 151 + 149}{3} = 150$$

Standard Deviation of Electric Power =

$$\sqrt{\frac{(351-353)^2 + (354-353)^2 + (354-353)^2}{3-1}} \Big/ \sqrt{3} = 1.0$$

Standard Deviation of Steam =

$$\sqrt{\frac{(238-249)^2 + (265-249)^2 + (244-249)^2}{3-1}} \Big/ \sqrt{3} = 8.2$$

Standard Deviation of Chilled Water =

$$\sqrt{\frac{(150-150)^2 + (151+150)^2 + (149-150)^2}{3-1}} \Big/ \sqrt{3} = 0.6$$

Last, based on the basic statistical amount, the upper and the lower limit values of the demand prediction are derived. Concretely, assume that the demand prediction upper limit value average=value+constant times of standard deviation and demand prediction lower limit value=average value−constant times of standard deviation. Herein, assuming that spreads of the prediction errors follow the Gaussian distribution, if the constant is 2.0, the demand prediction upper and lower limit values are obtained in the range of the corresponding probability 95%. If the constant is 3.0, it is obtained in the range of the corresponding probability 99%.

The demand prediction upper and lower limit values 4c of FIG. 4 are calculated on the basic statistics 4b. The foregoing description has concerned with the method of applying a standard deviation for deriving spreads of prediction errors. As another method, the table for holding the prediction error width for each condition may be predefined. The reference values of the demand prediction upper and lower limits may utilize not only the above-mentioned average values but also the recorded values in the near past. The use of the latter data allows the operator to obtain a policy of how to operate the supply device on the basis of the displayed target operation pattern upper and lower limits.

Figure 5:
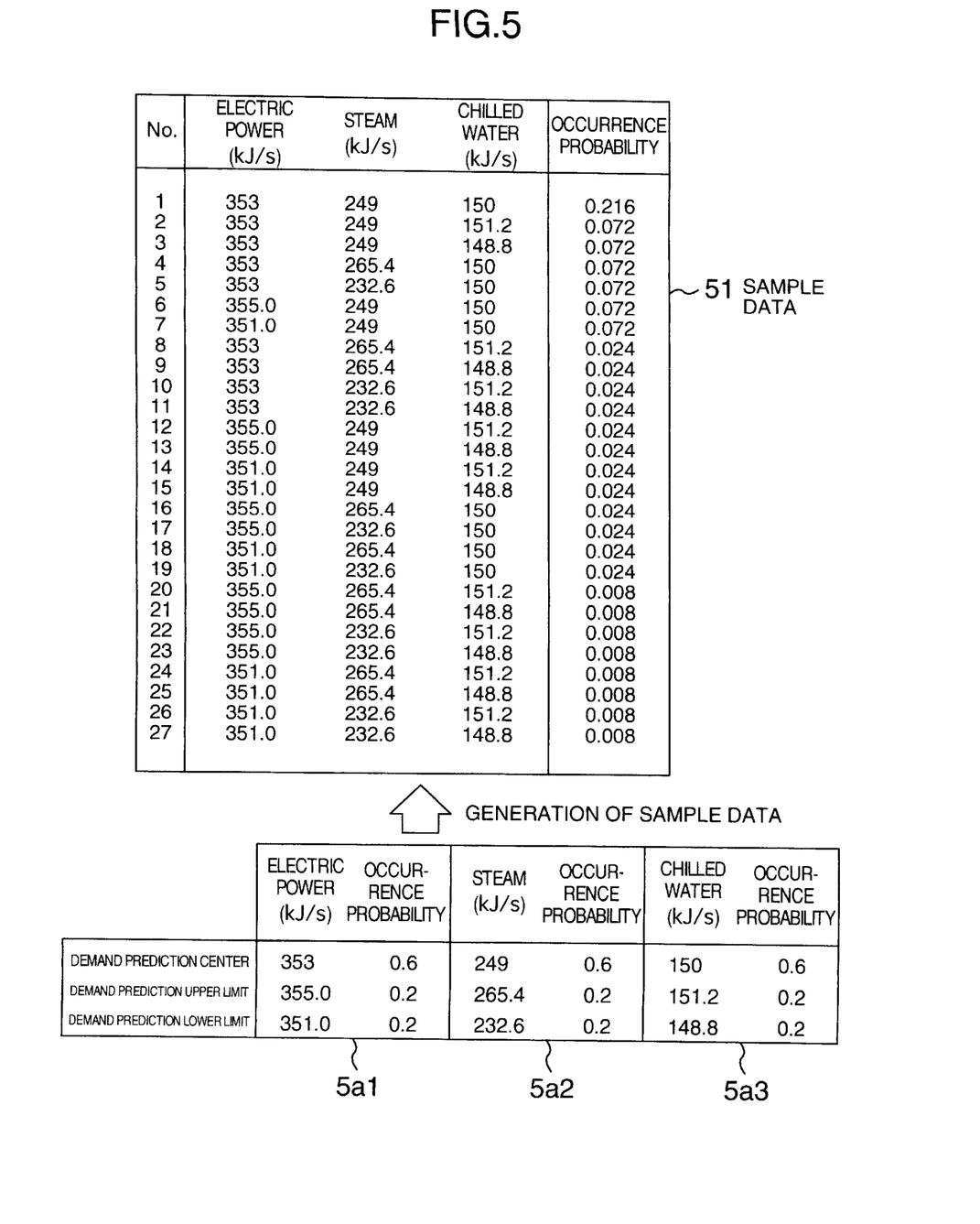
FIG. 5 is an explanatory table showing an example of generating sample data in a target operation pattern calculating unit.

The generation of the sample data will be described with reference to FIG. 5. The sample data 51 shown in FIG. 5 is generated by using the demand prediction upper and lower limit values 4c shown in FIG. 4. The sample data 51 includes a occurrence probability of each data item, which is derived on the assumption that the occurrence probabilities of an electric power demand value, a steam demand value and a chilled water demand value correspond to the values as described by 5a1, 5a2 and 5a3, respectively. In the sample data 51, the possible demand value is divided into three stages, a lower limit value, a center value and an upper limit value. In actual, it may be divided into more stages.

As a result, the highest occurrence probability 0.216 takes place in the case that the demand predictions of the electric power, the stream and the chilled water are 353 kJ/s, 249 kJ/s and 150 kJ/s, respectively.

Figure 6:
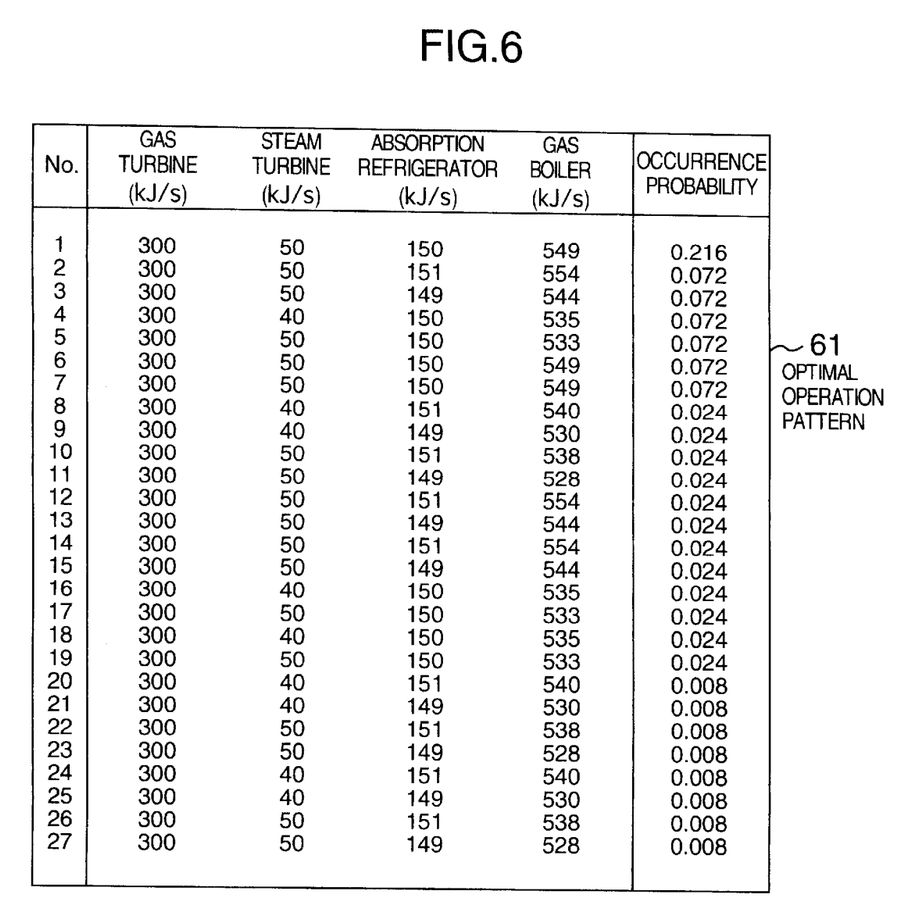
FIG. 6 is an explanatory table showing an example of an optimal operation pattern calculated in correspondence with each sample data unit.

The obtention of the optimal operation pattern will be described with reference to FIG. 6. Then, the optimal operation pattern of each combination of demand values will be obtained along the flow of FIG. 6. FIG. 6 exemplarily shows the optimal operation pattern 61 of each energy supply device generated on the sample data. As shown in FIG. 5, the number of the sample data units is 27, so 27 optimal operation patterns are prepared. The left-end numbers of FIG. 6 correspond with the left-end ones of FIG. 5. It means that the occurrence probabilities of FIG. 5 are common to those of FIG. 6. The method of obtaining the optimal operation pattern is executed by applying the technology described in ITO Kouichi and YOKOYAMA Ryouhei, "Optimal Planning of Cogeneration", pages 57 to 63, Sangyou-Tosho (1990). The illustrated data is based on the following configuration of the energy supply system. The electric power is generated by the gas turbine GT and the steam turbine ST. The steam is supplied from the gas turbine GT and the gas boiler GB and is consumed by the steam turbine ST and the absorption refrigerator AC. The remaining steam is supplied to the steam demand. The chilled water is merely supplied by the absorption refrigerator AC. The cogeneration energy supply facility shown in FIG. 12 consumes the energy as described below. That is, the gas turbine GT generates a steam of 600 kJ/s (double) as a byproduct when it produces an electric power of 300 kJ/s. The stream turbine ST consumes steam of 150 kJ/s (triple) when it produced an electric power of 50 kJ/s. The absorption refrigerator AC consumes steam of 750 kJ/s (quintuple) when it produces chilled water of 150 kJ/s.

In FIG. 5, the sample data of No. 1 includes an electric power demand of 353 kJ/s, a steam demand of 249 kJ/s and a chilled water demand of 150 kJ/s. In FIG. 6, the operation pattern of No. 1 generates steam of 600 kJ/s when the gas turbine GT produces an electric power of 300 kJ/s. The steam turbine ST consumes steam of 150 kJ/s and thereby produces an electric power of 50 kJ/s. Since the electric power demand is 353 kJ/s, the shortage of 3 kJ/s is fed from the commercial electric power. The absorption refrigerator AC consumes steam of 750 kJ/s and thereby produces chilled water of 150 kJ/s. The steam generated by the gas turbine GT is 600 kJ/s and the steam consumed by the steam turbine ST and the absorption refrigerator AC is 150+750= 900 kJ/s. Hence, the shortage is 300 kJ/s. The gas boiler GB is thus required to generate steam of 549 kJ/s in response to the steam demand of 249 kJ/s and the short steam demand of 300 kJ/s.

The steam turbine ST is adjusted to generate an electric power of 50 kJ/s if the steam demand is 232.6 kJ/s or 249 kJ/s or an electric power of 40 kJ/s when the steam demand is 265.4 kJ/s. If the electric power generated by the gas turbine GT and the steam turbine ST is not enough to the power demand, the shortage is fed from the commercial power.

Figure 7:
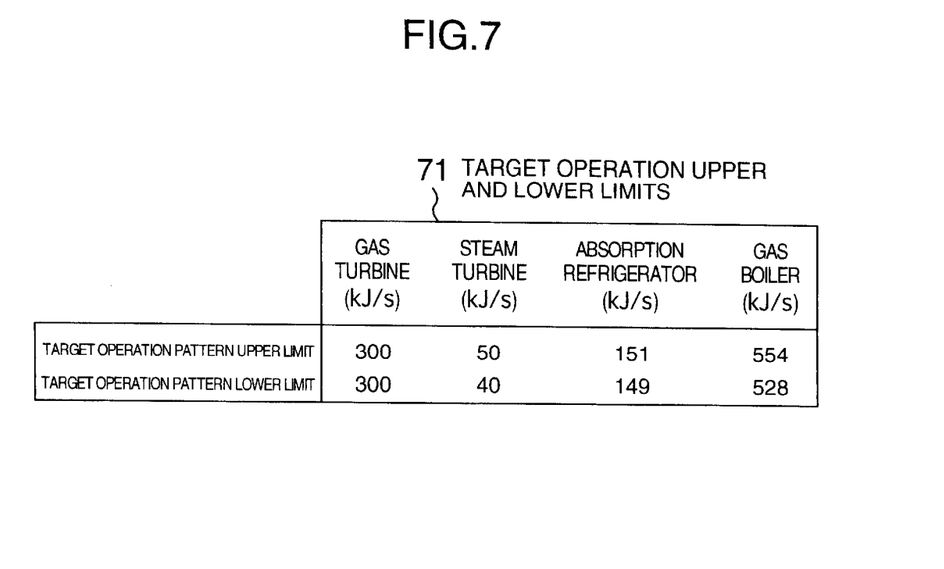
FIG. 7 is an explanatory table for describing an upper and a lower limits of a target operation pattern.

Lastly, based on the 27 operation patterns shown in FIG. 6, the process is executed to derive the target operation pattern upper and lower limits 71 shown in FIG. 7. FIG. 7 exemplarily shows the upper and lower limits of the target operation pattern. In this example, the maximum value and the minimum value of the operation pattern correspond to the upper limit and the lower limit of the target operation pattern, respectively. In this example, the upper limit and the lower limit of the target operation pattern in the gas turbine are both 300 kJ/s. Hence, it is understood that the gas turbine should be operated at an output of 300 kJ/s. The absorption refrigerator should be operated in a narrow range of 149 to 151. The steam turbine should be operated in a relatively wide range of 40 to 50 kJ/s and the gas boiler should be also operated in a relatively wide range of 528 to 544 kJ/s.

In general, the width between the upper and the lower limits of the target operation pattern depends on the following two factors. One factor is a width between the upper and the lower limits of the demand prediction and the other factor is a sensitivity to a demand change of the optimal operation pattern. As will be understood from the comparison of the standard deviations of the basic statistics 4b, the steam demand is so variable that the width between the upper and the lower limits of the steam demand prediction is made relatively wide as indicated by the upper and the lower limits 4c of the demand prediction. The gas turbine and the gas boiler are assumed as the steam supply source. If each optimal operation pattern of the gas turbine and the gas boiler has the same sensitivity to the demand change of the steam, the width between the upper and the lower limits of the target operation pattern of the gas turbine is substantially equal to that of the gas boiler. However, the resulting target operation pattern upper and lower limits 71 indicate that the width between the upper and the lower limits of the target operation pattern of the gas turbine is zero, while the upper limit of the gas boiler is 528 kJ/s and the lower limit thereof is 544 kJ/s. The difference of the width between the pattern upper and lower limits takes place between the gas turbine and the gas boiler results from the fact that the gas turbine has a small (zero) sensitivity of the optimal operation pattern to the steam demand change, while the gas boiler has a large sensitivity.

This sort of information is quite significant to the safely and economical operation of the energy supply facility by the operator. The sort of information can be obtained only if the system of this invention displays the upper and lower limits 71 of the target operation pattern shown in FIG. 7. It cannot be obtained if the background art merely displays the upper and the lower limits of the demand prediction.

Figure 8:
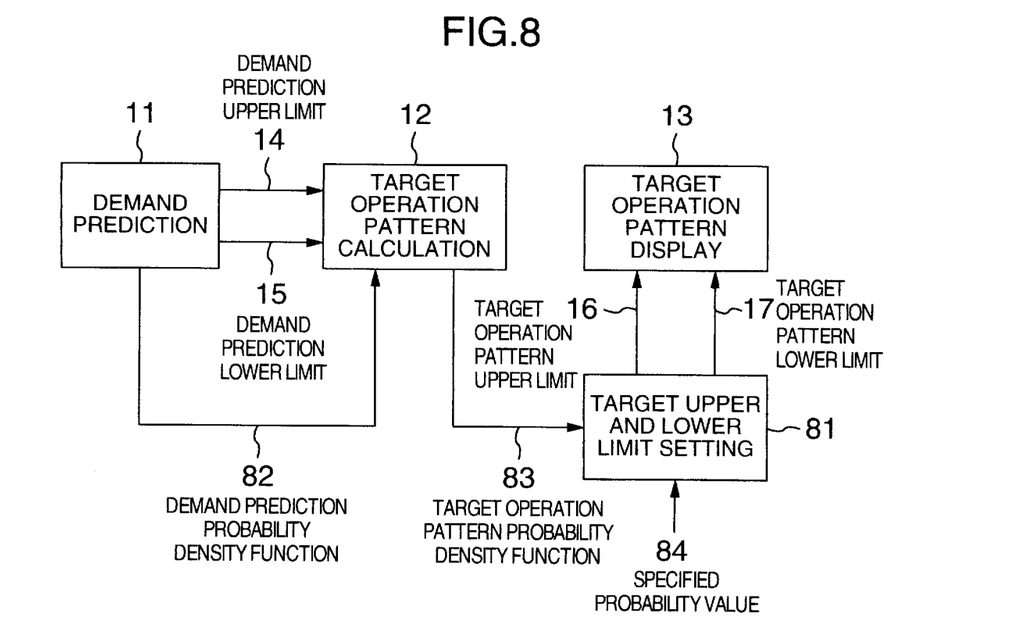
FIG. 8 is a function block diagram showing an operation support system provided with a target upper and lower limits setting unit according to a second embodiment of the present invention.

Then, the description will be oriented to the function configuration of the operation support system according to the second embodiment of the invention with reference to FIG. 8. This operation support system includes a target upper and lower limit setting unit 81, which serves to determine the upper and the lower limits of the target operation pattern so that the integrated value of the probability density distribution is made equal to a specified probability value 84. The action of the operation support system shown in FIG. 8 will be described with reference to the examples shown in FIGS. 4 to 7.

The demand predicting unit 11 serves to derive the demand prediction upper and lower limit values 14 and 15 as well as a demand prediction probability density function 82, which correspond to the occurrence probabilities 5a1, 5a2 and 5a3, respectively.

Then, the target operation pattern calculating unit 12 serves to derive a target operation pattern probability density function 83 through the use of the demand prediction upper and lower limit values 14 and 15 and the demand prediction probability density function 82. The coordination of the operation pattern and the occurrence probability of the optimal operation pattern 61 with respect to the gas boiler results in producing the demand prediction probability density function 91 of the target operation pattern of the gas boiler shown in FIG. 9, which corresponds to the target operation pattern probability density function 83 of the gas boiler.

Next, the target upper and lower limits setting unit 81 serves to derive the target operation pattern upper and lower limits 16 and 17 through the use of the target operation pattern probability density function and the specified probability value 84. For this purpose, the setting unit 81 serves to gradually widen the width between the upper and the lower limits with the target operation pattern as a center, the target operation pattern corresponding with the peak of the target operation pattern probability density distribution, for searching the width between the upper and the lower limits in which the integrated value coincides with the specified value.

Figure 9:
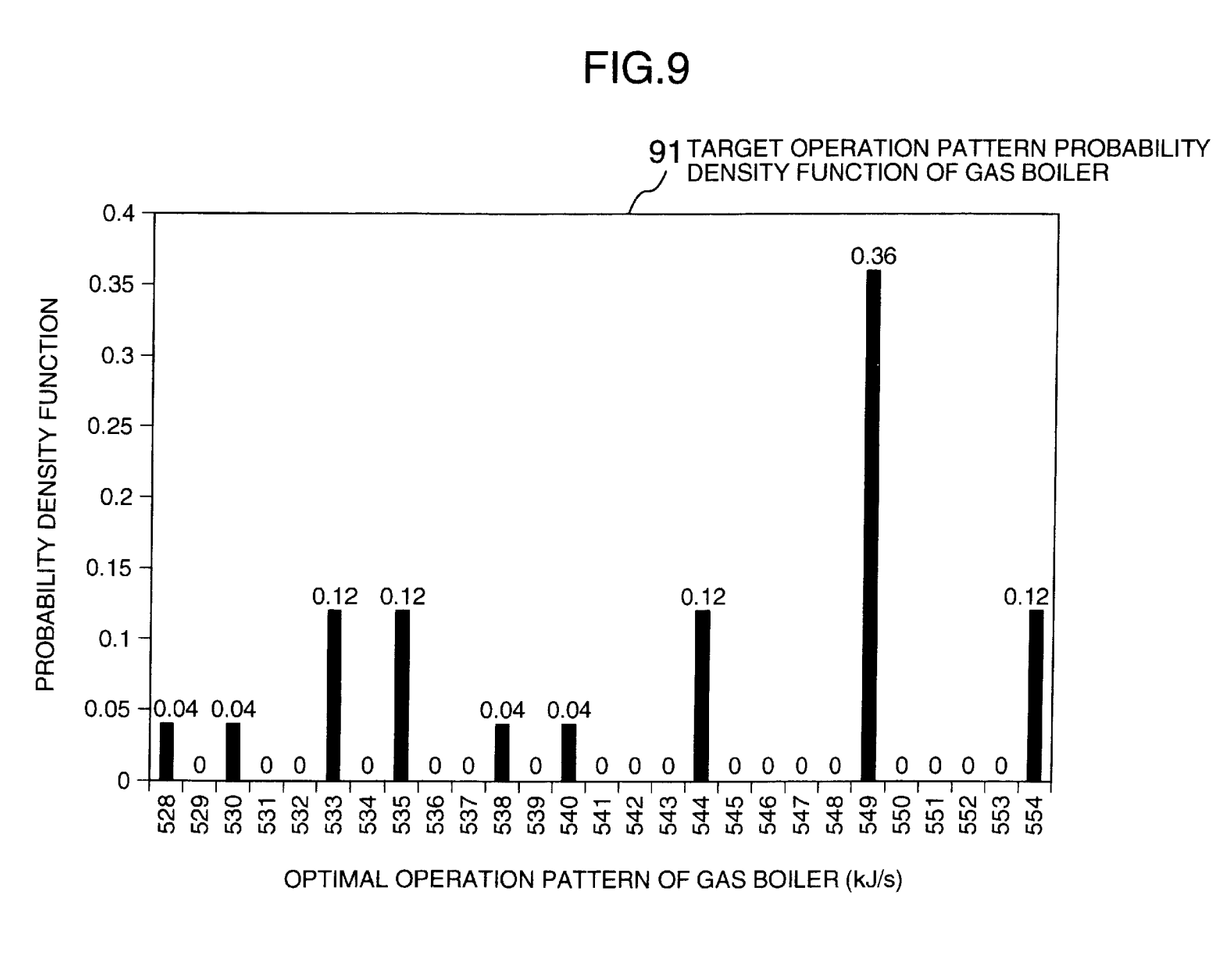
FIG. 9 is an explanatory table for describing an example of a target operation pattern probability density function of a gas boiler included in the second embodiment.

In turn, the description will be oriented to the operation of the target upper and lower limits setting unit 81 on the assumption that the specified probability value 84 is 0.8, that is, 80% with an example of the target operation pattern probability density function 91 shown in FIG. 9. The target upper and lower limit setting unit 81 has an original function of setting the target operation pattern upper and lower limits as to the gas turbine, the steam turbine, the absorption refrigerator and the gas boiler. Herein, as shown in FIG. 9, the gas boiler is used as an example. The same principle is applied to the other devices rather than the gas boiler. At first, the target upper and lower limits setting unit 81 determines the reference operation point. The method of determining the point may be a method of assuming the reference operation point as an average value, a center value or a most frequent value. In the graph shown in FIG. 9, the average value=528×0.04+530×0.04+533×0.12+535×0.12+ 538×0.04+540 ×0.04+544×0.12+549×0.36+544×0.12=543, the center value=(528+554)/2=541, and the most frequent value=549. Herein, the following description will be expanded as assuming the reference operation point as the most frequent value 549 kJ/s.

Hereafter, the process is executed to symmetrically move the upper limit and the lower limit from the reference operation point in the plus and the minus directions. When the total of the probabilities located between the upper and the lower limits reaches 80%, the upper and the lower limits are searched. At first, assuming that the reference operation point of 549 kJ/s is located on the upper and the lower limits, the probability is 0.36, which does not reach 0.8. If the width between the upper and the lower limits is widened like ±1, ±2, ±3, ±4, the probability is still 0.36. If the width is ±5, the lower limit is 544 kJ/s and the upper limit is 554 kJ/s. The probability of the area between the upper and the lower limits is 0.12+0.36+0.12=0.5, which does not still reach 0.8. If the width is widened into ±14, the lower limit is 535 kJ/s and the upper limit is 563 kJ/s, in which the probability of the area between the upper and the lower limits is 0.12+ 0.12+0.04+0.04+0.12+0.36+0.12=0.80, which finally reaches the specified value 0.8. Hence, the target upper and lower limits setting unit 81 determines that the target operation pattern lower limit is 535 kJ/s and the upper limit is 563 kJ/s. Further, the upper limit is delimited by the maximum value of 554 kJ/s of the operation pattern having nonzero probability so that the range between the upper and the lower limits of the target operation pattern is 535 to 554 kJ/s.

After the upper and the lower limits of the target operation pattern are determined, the target operation pattern displaying unit 13 displays the values to the operator.

The application of the foregoing method makes it possible to adjust the width between the upper and the lower limits of the target operation pattern by adjusting the specified probability value. In general, as a smaller specified probability is taken, the width between the upper and the lower limits of the target operation pattern is made smaller, which brings about an advantage that the target is so narrowed that it may be more understandable. On the other hand, it brings about a disadvantage that the difference of the width between the upper and the lower limits in each device is obscure. On the other hand, as a larger specified probability value is taken, the width between the upper and the lower limits of the target operation pattern is likely to be larger, which brings about a disadvantage that the target is so obscure that it cannot be easily grasped. On the other hand, it bring about an advantage that the difference of the width between the upper and the lower limits in each device is so clear. For example, in the example shown in FIG. 6, the probability in 300 kJ/s of the gas turbine reaches 100%, so that how largely the specified probability value may be assumed, the upper and the lower limits are both kept in 300 kJ/s. On the other hand, in the gas boiler, the width between the upper and the lower limits is made wider according to a larger specified probability value.

As will be understood from this example, a larger specified probability value requires the gas turbine to be operated in 300 kJ/s, while the gas boiler does not need to strictly consider the specified probability value. Roughly speaking, it is requested that a beginner operator assume a smaller specified probability value for making the target more obvious, while a skilled operator assume a larger value for grasping a target reliability.

Figure 10:
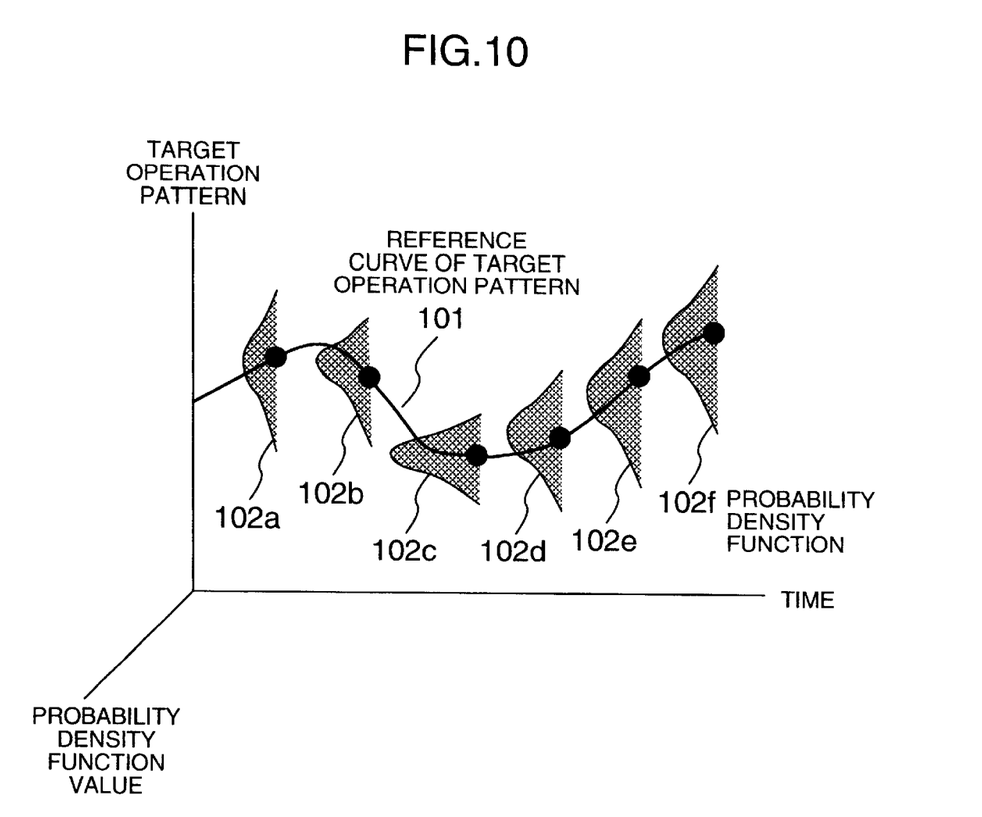
FIG. 10 is an explanatory chart for describing an example of a three-dimensional representation provided by an operation pattern displaying unit.

The description will be oriented to the three-dimensional representation on the target operation pattern displaying unit 13 in which a time, a target operation pattern and a target operation pattern probability density distribution are assigned to three axes with reference to FIG. 10. As shown, the target operation pattern displaying unit 13 outputs a three-dimensional representation in which the X axis corresponds with the time, the Y axis corresponds with the target operation pattern for the peak of the target operation pattern probability density distribution, and the Z axis corresponds with the target operation pattern probability density function. This type of three-dimensional representation makes it possible to more clearly present the time shift of the target operation pattern probability density distribution to the operator.

Figure 11:
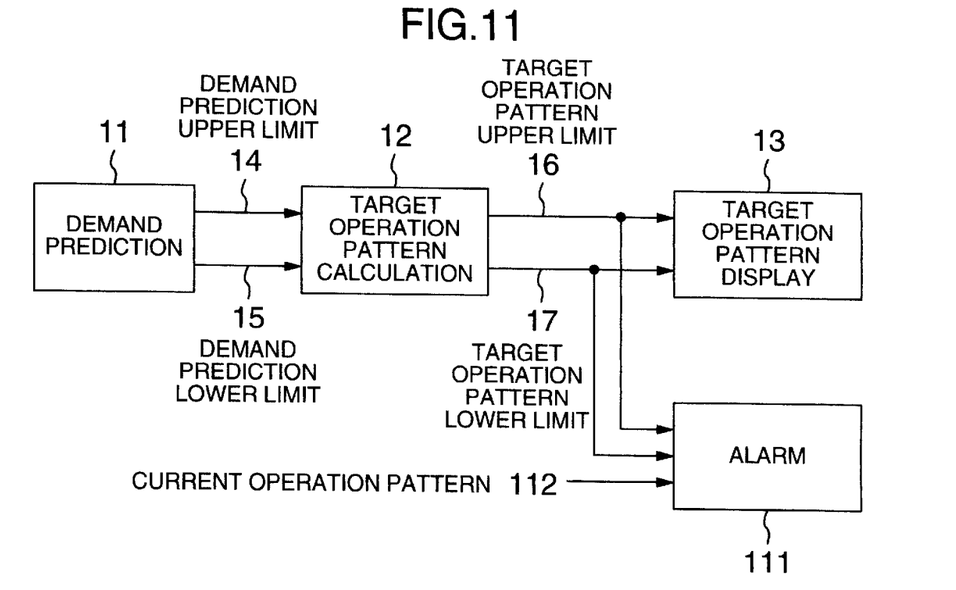
FIG. 11 is a function block diagram showing an operation support system provided with an alarming unit according to a third embodiment of the present invention.

In turn, the description will be oriented to the function configuration of the operation support system according to a third embodiment of the invention. This operation support system is characterized to have an alarming unit 111 in addition to the operation support system shown in FIG. 1. The alarming unit 111 compares the target operation pattern upper limit 16, the target operation pattern lower limit 17 and the current operation pattern 112 with one another and outputs an alarm if the current operation pattern departs from the target operation pattern upper and lower limits. The constantly checking of the proper fitting of the actual operation pattern in the range between the target operation pattern upper and lower limits is a dull work for a skilled operator having a deep knowledge of the optimal operation. The use of the alarming unit 111 allows the skilled operator to be released from the dull constant checking work.

It should be further understood by those skilled in the art that the foregoing description has been made on embodiments of the invention and that various changes and modifications may be made in the invention without departing from the spirit of the invention and the scope of the appended claims.

What is claimed is:

1. An operation support system of an energy supply facility having a plurality of energy forms, comprising:

demand predicting means for deriving demand prediction upper and lower limits of each energy form;

target operation pattern calculating means for deriving target operation pattern upper and lower limits corresponding with each energy form based on said demand prediction upper and lower limits; and target operation pattern displaying unit for displaying said target operation pattern upper and lower limits to show accuracy of the target operation pattern.

2. An operation support system as claimed in claim 1, further comprising alarming means for issuing an alarm if the actual operation pattern departs from the range between the upper and the lower limits of said target operation pattern.

3. An operation support system of an energy supply facility having a plurality of energy forms, comprising:

demand predicting means for deriving a demand prediction probability density distribution of each energy form;

target operation pattern calculating means for deriving a target operation pattern probability distribution corresponding with each energy form based on said demand prediction probability density distribution; and target operation pattern displaying means for displaying said target operation pattern probability density distribution to show accuracy of the target operation pattern.

4. An operation support system as claimed in claim 3, further comprising target upper and lower limits setting means for setting upper and lower limits of said target operation pattern so that an integrated value of said target operation pattern probability density distribution between the upper and the lower limits of said target operation pattern may become a specified value.

5. An operation support system as claimed in claim 4, further comprising alarming means for issuing an alarm if the actual operation pattern departs from the range between the upper and the lower limits of said target operation pattern.

6. An operation support system as claimed in claim 3, wherein said target operation pattern displaying means outputs a three-dimensional representation in which a time, the target operation pattern corresponding with a peak of said target operation pattern probability density distribution, and said target operation pattern probability density distribution are assigned to three axes.

7. An operation support system as claimed in claim 6, further comprising alarming means for issuing an alarm if the actual operation pattern departs from the range between the upper and the lower limits of said target operation pattern.

8. An operation support system as claimed in claim 3, further comprising alarming means for issuing an alarm if the actual operation pattern departs from the range between the upper and the lower limits of said target operation pattern.

* * * * *